United States Patent [19]

Nagahama et al.

[11] Patent Number: 4,658,525
[45] Date of Patent: Apr. 21, 1987

[54] SUPERVISORY CONTROL PANEL BOARD

[75] Inventors: Toshiyuki Nagahama; Hisashi Suzuki, both of Hitachi; Akira Yamamoto, Hitachiota, all of Japan

[73] Assignee: Hitachi, Ltd., Tokyo, Japan

[21] Appl. No.: 557,456

[22] Filed: Dec. 2, 1983

[30] Foreign Application Priority Data

Dec. 3, 1982 [JP] Japan .................. 57-211301

[51] Int. Cl.⁴ ............................................ G09F 13/04
[52] U.S. Cl. ....................................... 40/564; 40/10 R; 40/489
[58] Field of Search ............... 40/219, 224, 365, 564, 40/10 R, 605, 366, 489, 158

[56] References Cited

U.S. PATENT DOCUMENTS

| | | | |
|---|---|---|---|
| 1,289,982 | 12/1918 | Webber | 40/568 |
| 2,353,328 | 7/1944 | Winston | 40/10 R |
| 3,061,945 | 11/1962 | Hawkins | 434/366 |
| 3,261,112 | 7/1966 | Schlag | 434/224 |
| 3,358,395 | 12/1967 | Simonovidk . | |
| 3,421,232 | 1/1969 | Sherman et al. . | |
| 4,012,632 | 3/1977 | Stone | 40/541 |
| 4,333,253 | 6/1982 | Cooper . | |
| 4,419,838 | 12/1983 | Taylor et al. | 40/605 |

Primary Examiner—Gene Mancene
Assistant Examiner—Wenceslao J. Contreras
Attorney, Agent, or Firm—Antonelli, Terry & Wands

[57] ABSTRACT

A supervisory control panel board includes a supervisory control panel having illumination apertures therein at a supervisory display surface zone of the panel. The panel board also includes a dressing frame, which frame is removably mounted on the display surface of the supervisory control panel. When mounted on the supervisory control panel, the dressing frame supports a film member in a state wherein this film member is kept in close contact with the supervisory display surface. That film member is inscribed with a graphic diagram of the process steps desired to be supervised.

4 Claims, 7 Drawing Figures

SUPERVISORY CONTROL PANEL BOARD

BACKGROUND OF THE INVENTION

The present invention relates to a supervisory control panel board use to supervise the operating conditions of a sewage treatment plant, power generation plant, or the like.

DESCRIPTION OF THE PRIOR ART

In various industrial plants such as, for example sewage treatment plants or power generation plants, a supervisory control panel board having a display panel is used and a system arrangement of the plant is displayed on the display panel, to permit operations to supervise the operating conditions of the entire plant.

Conventionally, two methods are used to produce a display of the system arrangement of a plant. One of them is a mosaic method and the other is a silk-print method. In this mosaic method a supervisory display surface of the supervisory control panel is formed in a mosaic arrangement and a graphic diagram including, for example, figures, characters, etc. are inscribed in a block or blocks of the mosaic arrangement. On the other hand, in the silk-print method, a silk fabric (cloth) as a base medium, on which a graphic diagram is to be shown, is pasted onto the supervisory display panel by the use of an adhesive agent.

However, in the former mosaic method, the block or blocks must be newly prepared to modify the graphic diagram. This is troublesome. Further, it is difficult to reconstruct the mosaic arrangement at the site where it is installed. Besides, thee above-mentioned mosaic method requires new apertures to be formed in the supervisory control panel in order to support grids for fixing the blocks in place. The holes must be formed over an area of the panel corresponding to the size of the desired disply surface. Thus, the supervisory control panel board formed by the mosaic method has a complicated structure. In addition, troublesome and time consuming procedures are required for fabricating the necessary members or elements and assembling them in a supervisory control panel board. Thus, the resulting panel board is expensive.

On the other hand, with the latter silk-print method a graphic diagram can simply be rewritten when it is desired to modify the diagram. In such a case, however, the silk fabric base medium as a whole is usually replaced by a new, rewritten one because a used base medium will degrade the outer appearance of a new graphic diagram formed therein. Further, the removing of such silk fabric base medium from the supervisory control panel board is time consuming. This means that modifying the graphic diagram becomes troublesome. Further, it is frequently the case that a user's request for rewriting a graphic diagram involves changing the size of the supervisory display surface. Thus, the silk fabric base medium must be produced each time such a request is made. This means that this method is also troublesome in this regard as well.

SUMMARY OF THE INVENTION

The object of the present invention is to provide a supervisory control panel board which makes it possible to readily change a graphic diagram on the board and, at the same time, to easily reprepare a new supervisory display surface even when the size of the display surface is altered.

The present invention is characterized by such an arrangement that a film member on which a graphic diagram is inscribed is removably attached onto a display surface of the supervisory control panel so that the film member is held in close contact therewith.

BRIEF DESCRIPTION OF THE DRAWINGS

Other objects and features will become apparent from the following description which is explained with reference to the accompanying drawings, which are.

DESCRIPTION OF THE PREFERRED EMBODIMENT

Figure 1:
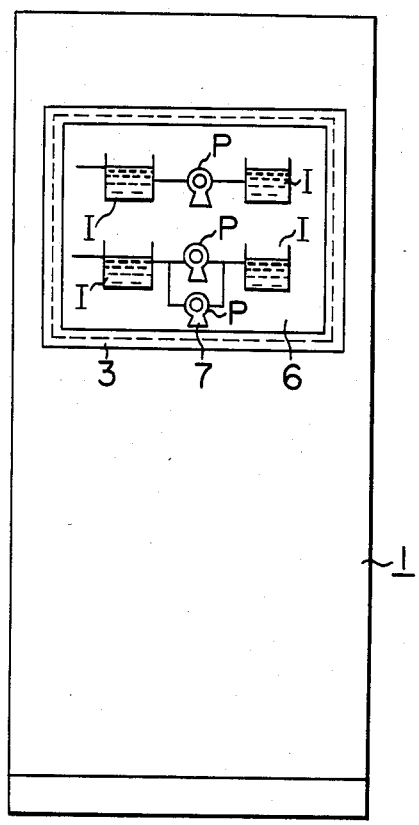
FIG. 1 a front view showing a supervisory control panel board according to an embodiment of the present invention.
Figure 2:
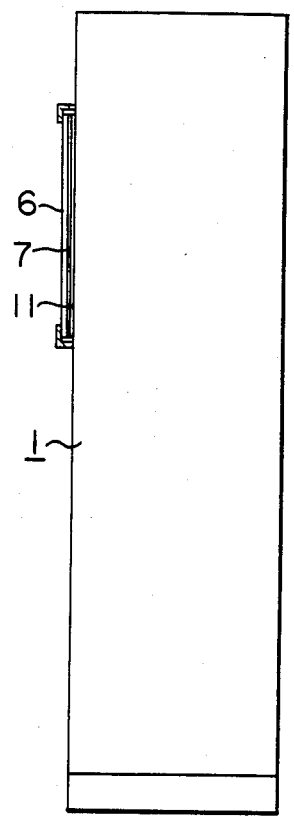
FIG. 2 is a side view, partly in section, of FIG. 1.
Figure 3:
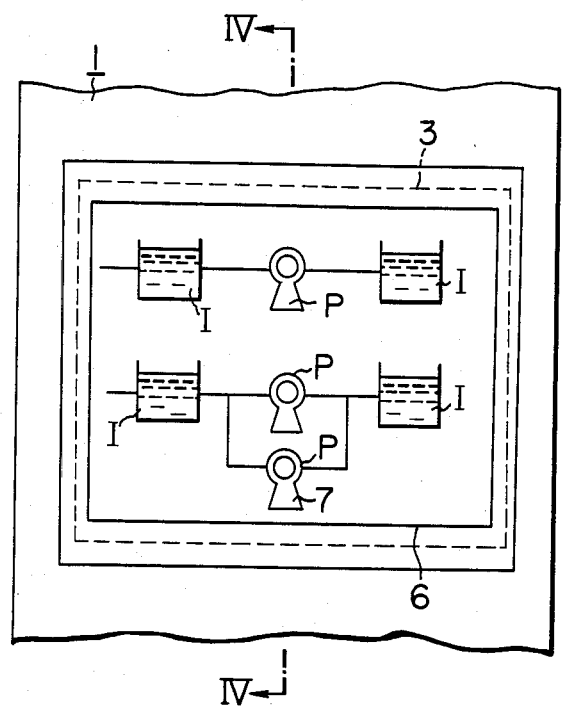
FIG. 3 is an enlarged front view, partly broken, of a main part of the supervisory control panel board shown in FIG. 1.

An embodiment of the present invention will now be described with reference to FIGS. 1 to 5. A graphic film 7 is attached onto a supervisory display surface 1A of a supervisory control panel 1 so that it is in close contact with the display surface 1A. On the film 7, a graphic diagram of the process steps in sewage treatment in a sewage treating station is shown. The diagram includes inscribed symbols for pumps P, wells I, etc. A rectangular dressing frame 3 is formed of steel which is L-shaped in cross section. A stud bolt 8 is welded to each of four corners of the dressing frame 3. The supervisory display surface 1A of the supervisory control panel 1 has apertures 1a formed therein for receiving the stud bolts 8 and apertures 1b for illuminating of the symbols on the diagram of the graphic film 7. In the illustrated example, the illumination apertures 1b are positioned so as to illuminate the pump symbols P. At the rear of the panel portions provided with the illumination apertures 1b, lamp cases 10 used to mount the lamps 9 are fixed by screws (not shown). The film 7 is located between a transparent acrylic plate 6 and a base film 11 as shown in the FIGS. 4 and 5. These members each are formed with apertures 6a, 7a or 11a at their four corners for permitting the stud bolts 8 to pass therethrough. The dressing frame 3 is fastened to the panel 1 by means of nuts 12 which are threaded onto the ends of the stud bolts 8 after the bolts are inserted through the mounting apertures 1a of the panel 1.

Figure 4:
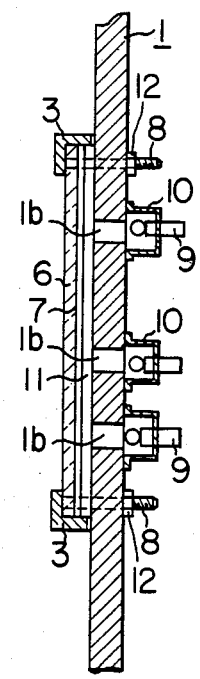
FIG. 4 is a sectional view taken along the line A—A of FIG. 3.
Figure 5:
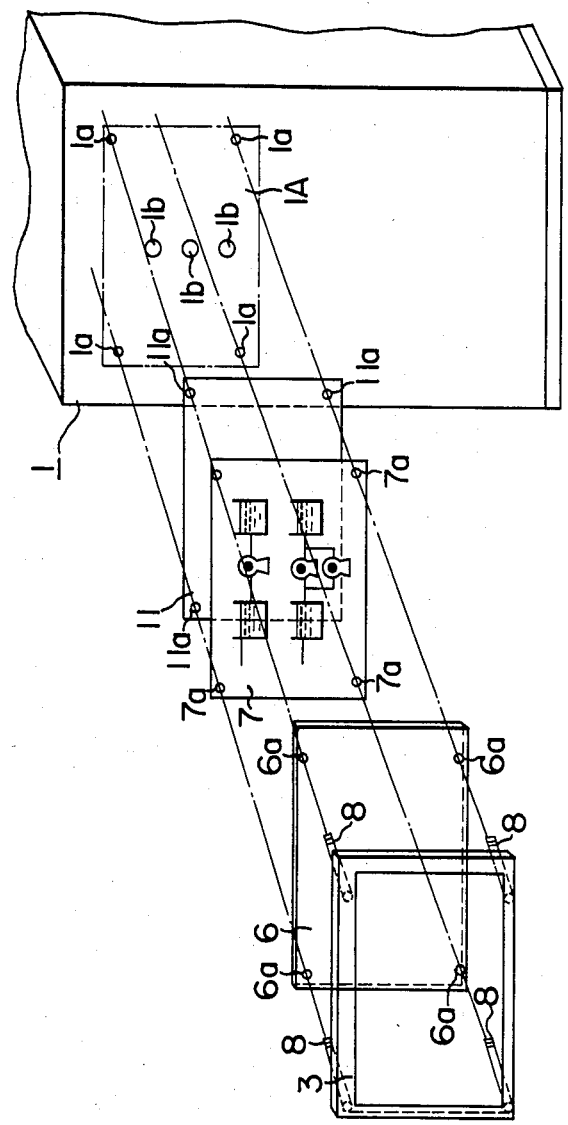
FIG. 5 is a perspective view showing the manner in which the supervisory control panel board is asssembled.

When, in the above-mentioned construction, the film 7 is mounted on the supervisory control panel 1, the stud bolts 8 of the dressing frame 3 pass through the transparent acrylic plate 6, the film 7 and the base film 11 in mentioned order, those overlapping one another, the transparent acrylic plate 6 thus being situated at the outermost position of the laminate. Next, the stud bolts 8 pass through the mounting apertures 1a of the supervisory control panel 1 and the dressing frame 3 is mounted thereon by threading the nuts 12 on the bolts on the rear face side of the panel 1. Thus, the film 7 is mounted on the panel 1 through the base film 11 so that it is in close contact with the same as shown in FIG. 4.

Figure 6:
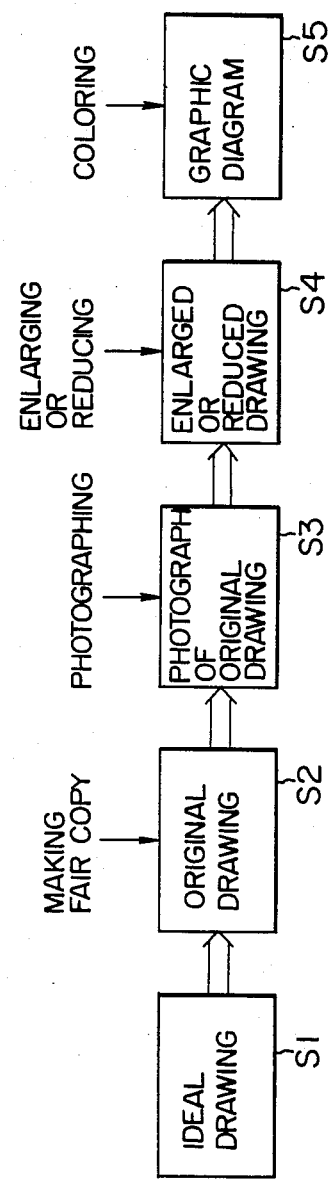
FIG. 6 shows the process steps of producing a graphic film.

FIG. 6 is a step-sequence chart which shows an example of a method of making the graphic film 7.

First, in the step S1, a graphic diagram of the plant treatment procedure to be displayed is informally drawn or inscribed, and, in the step S2, a formal drawing thereof is made to thereby prepare an original graphic diagram. Further in the step 3, a photograph is taken of this diagram to produce a negative film. In the step S4, the negative film is printed to produce a film of an enlarged (or reduced) size equal to that of the supervisory display surface 1A. In the step S5, the black and white film obtained in the step S4 is colored, thereby producing a graphic film 7. By way of example, the graphic film 7 thus obtained is illustrated in FIG. 7.

Figure 7:
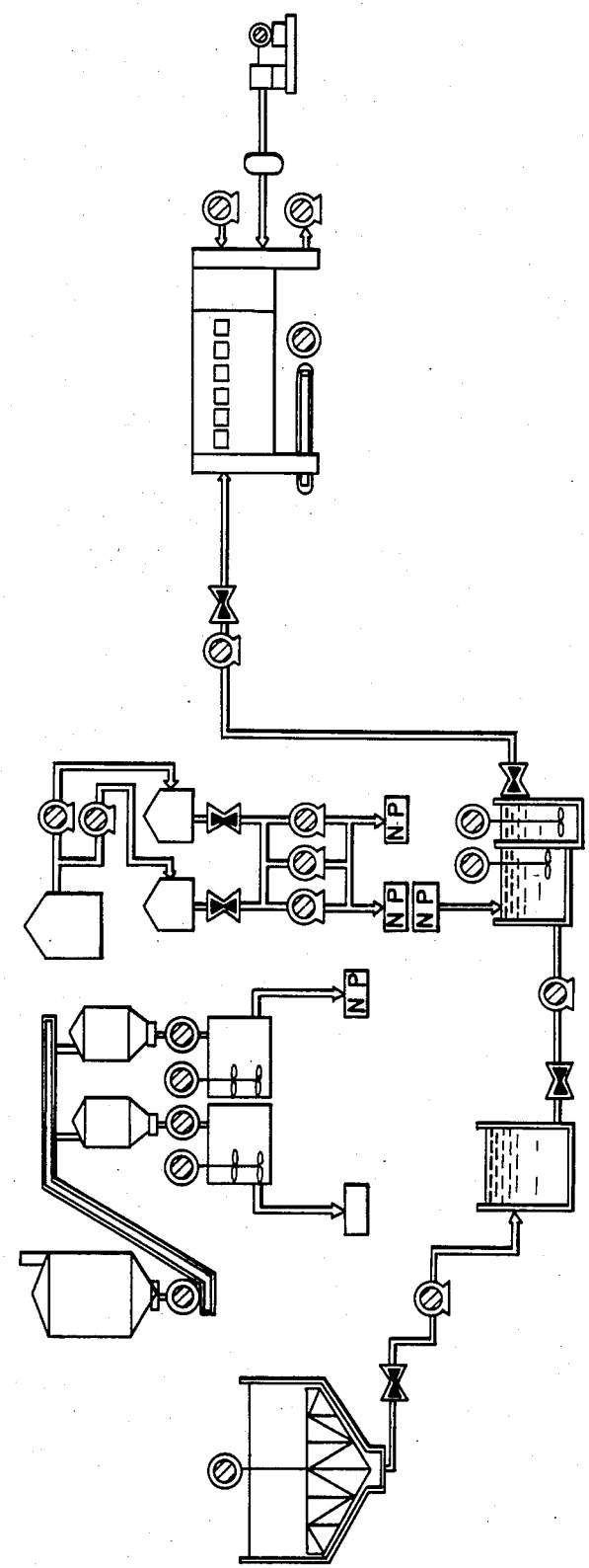
FIG. 7 is a front view showing an example of the graphic film.

Where, in producing such a graphic film 7 as shown in FIG. 7, it is desired to add a new device or means is desired to be added to the basic plant treatment procedure already inscribed in the previous graphic film, it is possible to prepare a new graphic film illustrating the additional device or means and superpose the new film over the previous graphic film so that a graphic diagram is formed of a synthesis of the plurality of graphic diagrams respectively inscribed on the plurality of films. By so doing, a graphic diagram which satisfies the request of the client or user can be quickly prepared.

To change the graphic diagram of the inscribed supervisory control panel board according to of invention the, film 7 is removed by disassembling the components in the reverse assembling order to the above-mentioned order in which such components are assembled. Then, a fresh film member 7 is mounted in place of the previous one. The change can thereby be readily accomplished. Where, at this time, it is necessary to rework the supervisory control panel 1, by performing an operation such as boring, for example, it is possible to perform such operation while the graphic film 7, etc. are removed from the panel 1. Therefore, there will be no damage to the film 7 by the reworking operation and the operation itself can be easily carried out. Further, even when it is required to make a change in the size of the supervisory display surface it is possible to easily satisfy such requirement by changing the magnification to which the graphic film is to be enlarged or reduced in size in the step S4 illustrated in FIG. 6. In addition, since a number of colors can be used at the time of coloring in the step S5 of FIG. 6, it is possible to produce a colorful graphic diagram.

As described above, according to the present invention, it is readily possible to change the graphic diagram and, at the same time, it is easy to prepare a new supervisory display film even when the size of the display zone is changed. Further, the invention has an advantage also in that the supervision of the process using the board of the invention is facilitated because of the colorful display of the graphic film.

What is claimed is:

1. A supervisory control panel board including:
   (a) a supervisory control panel having a supervisory display surface zone in which illumination apertures are formed;
   (b) a plurality of film members superposed one over another and on which graphic diagrams are respectively inscribed so that a graphic diagram is formed of a synthesis of the plurality of graphic diagram respectively inscribed on the plurality of film members, said graphic diagrams being obtained by enlargement or reduction of views which are taken on photographic films from original illustrations;
   (c) a dressing frame mounted on said supervisory display surface zone, for supporting said film members so that the same are in close contact with said supervisory display surface zone, said dressing frame being removable from said supervisory display surface zone; and,
   (d) a transparent plate supported by said dressing frame and arranged to make said film members press-contact with said supervisory display surface zone.

2. A supervisory control panel board according to claim 1, wherein said film members have their graphic diagrams colored.

3. A supervisory control panel board including:
   (a) a supervisory control panel having a supervisory display surface zone in which illumination apertures are formed;
   (b) a plurality of film members superposed one over another and on which graphic diagrams are respectively inscribed so that a graphic diagram is formed of a synthesis of the plurality of graphic diagram respectively inscribed on the plurality of film members, said graphic diagrams being obtained by enlargement or reduction of views which are taken on phtographic films from original illustrations;
   (c) a dressing frame mounted on said supervisory display surface zone, said dressing frame being removable from said supervisory display surface zone;
   (d) a transparent plate supported by said dressing frame and arranged to make said film members press-contact with said supervisory display surface zone; and
   (e) a base film member supported by said dressing frame and located on said film members at the side on which said supervisory display surface zone exists.

4. A supervisory control panel board according to claim 3, wherein said film members have their graphic diagrams colored.

* * * * *